(12) United States Patent
Jacobsen et al.

(10) Patent No.: US 8,205,695 B2
(45) Date of Patent: Jun. 26, 2012

(54) CONFORMABLE TRACK ASSEMBLY FOR A ROBOTIC CRAWLER

(75) Inventors: Stephen C. Jacobsen, Salt Lake City, UT (US); Brian J. Maclean, Salt Lake City, UT (US); Ralph W. Pensel, Sandy, UT (US); Christopher R. Hirschi, Salt Lake City, UT (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/765,618

(22) Filed: Apr. 22, 2010

(65) Prior Publication Data

US 2010/0201185 A1    Aug. 12, 2010

Related U.S. Application Data

(63) Continuation of application No. 11/985,324, filed on Nov. 13, 2007.

(60) Provisional application No. 60/858,805, filed on Nov. 13, 2006.

(51) Int. Cl.
  *B62D 55/14* (2006.01)
  *B62D 55/065* (2006.01)
(52) U.S. Cl. ........ 180/9.1; 180/9.44; 305/124; 305/132; 305/141
(58) Field of Classification Search .......... 180/9.1
  See application file for complete search history.

(56) References Cited

U.S. PATENT DOCUMENTS

| | | |
|---|---|---|
| 1,107,874 A | 8/1914 | Appleby |
| 1,112,460 A | 10/1914 | Leavitt |
| 1,515,756 A | 11/1924 | Roy |
| 1,975,726 A | 10/1934 | Martinage |
| 2,082,920 A | 6/1937 | Aulmont |
| 3,107,643 A | 10/1963 | Edwards |
| 3,166,138 A | 1/1965 | Dunn, Jr. |
| 3,190,286 A | 6/1965 | Stokes |
| 3,215,219 A | 11/1965 | Forsyth |
| 3,223,462 A | 12/1965 | Dalrymple |
| 3,266,059 A | 8/1966 | Stelle |
| 3,284,964 A | 11/1966 | Saito |

(Continued)

FOREIGN PATENT DOCUMENTS

CA    2512299    9/2004

(Continued)

OTHER PUBLICATIONS

U.S. Appl. No. 12/694,996, filed Jan. 27, 2010, Stephen C. Jacobsen; Office Action Issued Sep. 30, 2010.

(Continued)

*Primary Examiner* — Joanne Silbermann
*Assistant Examiner* — Marlon Arce
(74) *Attorney, Agent, or Firm* — Thorpe North & Western LLP

(57) ABSTRACT

A suspension system for a lightweight robotic crawler is disclosed. The suspension system provides for mounting of a flexible endless track thereon. The suspension system includes a forward guide and a rearward guide around which the endless track can be looped. A deflector positioned between the forward guide and the rearward guide downwardly deflects a ground-engaging portion of the endless track to form a peaked area. The peaked area can support the lightweight robotic vehicle allowing alteration of a distribution of load over the ground-engaging portion of the endless track with respect to a supporting surface.

21 Claims, 3 Drawing Sheets

U.S. PATENT DOCUMENTS

| | | |
|---|---|---|
| 3,311,424 A | 3/1967 | Taylor |
| 3,362,492 A | 1/1968 | Hansen |
| 3,387,896 A | 6/1968 | Sobota |
| 3,489,236 A | 1/1970 | Goodwin |
| 3,497,083 A | 2/1970 | Anderson |
| 3,565,198 A | 2/1971 | Ames |
| 3,572,325 A | 3/1971 | Bazell |
| 3,609,804 A | 10/1971 | Morrison |
| 3,650,343 A | 3/1972 | Helsell |
| 3,700,115 A | 10/1972 | Johnson |
| 3,707,218 A | 12/1972 | Payne |
| 3,712,481 A | 1/1973 | Harwood |
| 3,715,146 A | 2/1973 | Robertson |
| 3,757,635 A | 9/1973 | Hickerson |
| 3,808,078 A | 4/1974 | Snellman |
| 3,820,616 A | 6/1974 | Juergens |
| 3,841,424 A | 10/1974 | Purcell |
| 3,864,983 A | 2/1975 | Jacobsen |
| 3,933,214 A | 1/1976 | Guibord |
| 3,934,664 A | 1/1976 | Pohjola |
| 3,974,907 A | 8/1976 | Shaw |
| 4,015,553 A | 4/1977 | Middleton |
| 4,051,914 A | 10/1977 | Pohjola |
| 4,059,315 A | 11/1977 | Jolliffe |
| 4,068,905 A | 1/1978 | Black |
| 4,107,948 A | 8/1978 | Maolaug |
| 4,109,971 A | 8/1978 | Black |
| 4,132,279 A | 1/1979 | Van der Lende |
| 4,218,101 A | 8/1980 | Thompson |
| 4,260,053 A | 4/1981 | Onodera |
| 4,332,317 A | 6/1982 | Bahre |
| 4,332,424 A | 6/1982 | Thompson |
| 4,339,031 A | 7/1982 | Densmore |
| 4,393,728 A | 7/1983 | Larson |
| 4,396,233 A | 8/1983 | Slaght |
| 4,453,611 A | 6/1984 | Stacy, Jr. |
| 4,483,407 A | 11/1984 | Iwamoto et al. |
| 4,489,826 A | 12/1984 | Dubson |
| 4,494,417 A | 1/1985 | Larson |
| 4,551,061 A | 11/1985 | Olenick |
| 4,589,460 A | 5/1986 | Albee |
| 4,621,965 A | 11/1986 | Wilcock |
| 4,636,137 A | 1/1987 | Lemelson |
| 4,646,906 A | 3/1987 | Wilcox, Jr. |
| 4,661,039 A | 4/1987 | Brenhold |
| 4,671,774 A | 6/1987 | Owsen |
| 4,700,693 A | 10/1987 | Lia |
| 4,706,506 A | 11/1987 | Lestelle |
| 4,712,969 A | 12/1987 | Kimura |
| 4,713,896 A | 12/1987 | Jennens |
| 4,714,125 A | 12/1987 | Stacy, Jr. |
| 4,727,949 A | 3/1988 | Rea |
| 4,736,826 A | 4/1988 | White et al. |
| 4,752,105 A | 6/1988 | Barnard |
| 4,756,662 A | 7/1988 | Tanie |
| 4,765,795 A | 8/1988 | Rebman |
| 4,784,042 A | 11/1988 | Paynter |
| 4,796,607 A | 1/1989 | Allred, III |
| 4,806,066 A | 2/1989 | Rhodes |
| 4,815,319 A | 3/1989 | Clement |
| 4,815,911 A | 3/1989 | Bengtsson |
| 4,818,175 A | 4/1989 | Kimura |
| 4,828,339 A | 5/1989 | Thomas |
| 4,828,453 A | 5/1989 | Martin et al. |
| 4,848,179 A | 7/1989 | Ubhayakar |
| 4,862,808 A | 9/1989 | Hedgecoxe |
| 4,878,451 A | 11/1989 | Siren |
| 4,900,218 A | 2/1990 | Sutherland |
| 4,909,341 A | 3/1990 | Rippingale |
| 4,924,153 A | 5/1990 | Toru et al. |
| 4,932,491 A | 6/1990 | Collins, Jr. |
| 4,932,831 A | 6/1990 | White et al. |
| 4,936,639 A | 6/1990 | Pohjola |
| 4,997,790 A | 3/1991 | Woo |
| 5,018,591 A | 5/1991 | Price |
| 5,021,798 A | 6/1991 | Ubhayakar |
| 5,022,812 A | 6/1991 | Coughlan |
| 5,046,914 A | 9/1991 | Holland et al. |
| 5,080,000 A | 1/1992 | Bubic |
| 5,130,631 A | 7/1992 | Gordon |
| 5,142,932 A | 9/1992 | Moya |
| 5,174,168 A | 12/1992 | Takagi |
| 5,174,405 A | 12/1992 | Carra |
| 5,186,526 A | 2/1993 | Pennington |
| 5,199,771 A | 4/1993 | James |
| 5,205,612 A | 4/1993 | Sugden et al. |
| 5,214,858 A | 6/1993 | Pepper |
| 5,219,264 A | 6/1993 | McClure et al. |
| 5,252,870 A | 10/1993 | Jacobsen |
| 5,297,443 A | 3/1994 | Wentz |
| 5,317,952 A | 6/1994 | Immega |
| 5,337,732 A | 8/1994 | Grundfest |
| 5,350,033 A | 9/1994 | Kraft |
| 5,354,124 A | 10/1994 | James |
| 5,363,935 A | 11/1994 | Schempf |
| 5,386,741 A | 2/1995 | Rennex |
| 5,413,454 A | 5/1995 | Movsesian |
| 5,426,336 A | 6/1995 | Jacobsen |
| 5,428,713 A | 6/1995 | Matsumaru |
| 5,435,405 A | 7/1995 | Schempf |
| 5,440,916 A | 8/1995 | Stone et al. |
| 5,443,354 A | 8/1995 | Stone et al. |
| 5,451,135 A | 9/1995 | Schempf |
| 5,465,525 A | 11/1995 | Mifune |
| 5,466,056 A | 11/1995 | James |
| 5,469,756 A | 11/1995 | Feiten |
| 5,516,249 A | 5/1996 | Brimhall |
| 5,551,545 A | 9/1996 | Gelfman |
| 5,556,370 A | 9/1996 | Maynard |
| 5,562,843 A | 10/1996 | Yasumoto |
| 5,567,110 A | 10/1996 | Sutherland |
| 5,570,992 A | 11/1996 | Lemelson |
| 5,573,316 A | 11/1996 | Wankowski |
| 5,588,688 A | 12/1996 | Jacobsen |
| 5,672,044 A | 9/1997 | Lemelson |
| 5,697,285 A | 12/1997 | Nappi |
| 5,712,961 A | 1/1998 | Matsuo |
| 5,749,828 A | 5/1998 | Solomon |
| 5,770,913 A | 6/1998 | Mizzi |
| 5,816,769 A | 10/1998 | Bauer |
| 5,821,666 A | 10/1998 | Matsumoto |
| 5,842,381 A | 12/1998 | Feiten |
| RE36,025 E | 1/1999 | Suzuki |
| 5,878,783 A | 3/1999 | Smart |
| 5,888,235 A | 3/1999 | Jacobsen |
| 5,902,254 A | 5/1999 | Magram |
| 5,906,591 A | 5/1999 | Dario |
| 5,984,032 A | 11/1999 | Gremillion |
| 5,996,346 A | 12/1999 | Maynard |
| 6,016,385 A | 1/2000 | Yee |
| 6,030,057 A | 2/2000 | Fikse |
| 6,056,237 A | 5/2000 | Woodland |
| 6,107,795 A | 8/2000 | Smart |
| 6,109,705 A | 8/2000 | Courtemanche |
| 6,113,343 A | 9/2000 | Goldenberg et al. |
| 6,132,133 A | 10/2000 | Muro et al. |
| 6,138,604 A | 10/2000 | Anderson |
| 6,162,171 A | 12/2000 | Ng |
| 6,186,604 B1 | 2/2001 | Fikse |
| 6,203,126 B1 | 3/2001 | Harguth |
| 6,260,501 B1 | 7/2001 | Agnew |
| 6,263,989 B1 | 7/2001 | Won |
| 6,264,293 B1 | 7/2001 | Musselman |
| 6,264,294 B1 | 7/2001 | Musselman et al. |
| 6,281,489 B1 | 8/2001 | Tubel et al. |
| 6,323,615 B1 | 11/2001 | Khairallah |
| 6,325,749 B1 | 12/2001 | Inokuchi et al. |
| 6,333,631 B1 | 12/2001 | Das et al. |
| 6,339,993 B1 | 1/2002 | Comello |
| 6,380,889 B1 | 4/2002 | Herrmann et al. |
| 6,394,204 B1 | 5/2002 | Haringer |
| 6,405,798 B1 | 6/2002 | Barrett et al. |
| 6,408,224 B1 | 6/2002 | Okamoto |
| 6,411,055 B1 | 6/2002 | Fujita |
| 6,422,509 B1 | 7/2002 | Yim |
| 6,430,475 B2 | 8/2002 | Okamoto |
| 6,431,296 B1 | 8/2002 | Won |

| | | |
|---|---|---|
| 6,446,718 B1 | 9/2002 | Barrett et al. |
| 6,450,104 B1 | 9/2002 | Grant |
| 6,477,444 B1 | 11/2002 | Bennett et al. |
| 6,484,083 B1 | 11/2002 | Hayward |
| 6,488,306 B1 | 12/2002 | Shirey et al. |
| 6,505,896 B1 | 1/2003 | Boivin |
| 6,512,345 B2 | 1/2003 | Borenstein |
| 6,523,629 B1 | 2/2003 | Buttz |
| 6,529,806 B1 | 3/2003 | Licht |
| 6,535,793 B2 | 3/2003 | Allard |
| 6,540,310 B1 | 4/2003 | Cartwright |
| 6,557,954 B1 | 5/2003 | Hattori |
| 6,563,084 B1 | 5/2003 | Bandy |
| 6,574,958 B1 | 6/2003 | Macgregor |
| 6,576,406 B1 | 6/2003 | Jacobsen et al. |
| 6,595,812 B1 | 7/2003 | Haney |
| 6,610,007 B2 | 8/2003 | Belson |
| 6,619,146 B2 | 9/2003 | Kerrebrock |
| 6,636,781 B1 | 10/2003 | Shen et al. |
| 6,651,804 B2 | 11/2003 | Thomas |
| 6,652,164 B2 | 11/2003 | Stiepel et al. |
| 6,668,951 B2 | 12/2003 | Won |
| 6,708,068 B1 | 3/2004 | Sakaue |
| 6,715,575 B2 | 4/2004 | Karpik |
| 6,725,128 B2 | 4/2004 | Hogg et al. |
| 6,772,673 B2 | 8/2004 | Seto |
| 6,773,327 B1 | 8/2004 | Felice |
| 6,774,597 B1 | 8/2004 | Borenstein |
| 6,799,815 B2 | 10/2004 | Krishnan |
| 6,820,653 B1 | 11/2004 | Schempf |
| 6,831,436 B2 | 12/2004 | Gonzalez |
| 6,835,173 B2 | 12/2004 | Couvillon, Jr. |
| 6,837,318 B1 * | 1/2005 | Craig et al. .................. 180/6.7 |
| 6,840,588 B2 | 1/2005 | Deland |
| 6,866,671 B2 | 3/2005 | Tierney |
| 6,870,343 B2 | 3/2005 | Borenstein |
| 6,917,176 B2 * | 7/2005 | Schempf et al. ......... 318/568.11 |
| 6,923,693 B2 | 8/2005 | Borgen |
| 6,936,003 B2 | 8/2005 | Iddan |
| 6,959,231 B2 | 10/2005 | Maeda |
| 7,020,701 B1 | 3/2006 | Gelvin et al. |
| 7,040,426 B1 | 5/2006 | Berg |
| 7,044,245 B2 | 5/2006 | Anhalt et al. |
| 7,069,124 B1 | 6/2006 | Whittaker et al. |
| 7,090,637 B2 | 8/2006 | Danitz |
| 7,137,465 B1 | 11/2006 | Kerrebrock |
| 7,144,057 B1 | 12/2006 | Young et al. |
| 7,171,279 B2 | 1/2007 | Buckingham et al. |
| 7,188,473 B1 | 3/2007 | Asada |
| 7,188,568 B2 | 3/2007 | Stout |
| 7,228,203 B2 | 6/2007 | Koselka et al. |
| 7,235,046 B2 | 6/2007 | Anhalt et al. |
| 7,331,436 B1 | 2/2008 | Pack et al. |
| 7,387,179 B2 | 6/2008 | Anhalt et al. |
| 7,415,321 B2 | 8/2008 | Okazaki et al. |
| 7,475,745 B1 | 1/2009 | DeRoos |
| 7,539,557 B2 | 5/2009 | Yamauchi |
| 7,546,912 B1 | 6/2009 | Pack et al. |
| 7,597,162 B2 | 10/2009 | Won |
| 7,600,592 B2 * | 10/2009 | Goldenberg et al. .......... 180/9.1 |
| 7,645,110 B2 | 1/2010 | Ogawa et al. |
| 7,654,348 B2 | 2/2010 | Ohm et al. |
| 7,775,312 B2 | 8/2010 | Maggio |
| 7,798,264 B2 | 9/2010 | Hutcheson et al. |
| 7,843,431 B2 | 11/2010 | Robbins et al. |
| 7,860,614 B1 | 12/2010 | Reger |
| 7,974,736 B2 | 7/2011 | Morin et al. |
| 2001/0037163 A1 | 11/2001 | Allard |
| 2002/0128714 A1 | 9/2002 | Manasas et al. |
| 2002/0140392 A1 | 10/2002 | Borenstein |
| 2003/0000747 A1 | 1/2003 | Sugiyama |
| 2003/0069474 A1 | 4/2003 | Couvillon, Jr. |
| 2003/0097080 A1 | 5/2003 | Esashi |
| 2003/0110938 A1 | 6/2003 | Seto |
| 2003/0223844 A1 | 12/2003 | Schiele |
| 2004/0030571 A1 | 2/2004 | Solomon |
| 2004/0099175 A1 | 5/2004 | Perrot et al. |
| 2004/0103740 A1 | 6/2004 | Townsend |
| 2004/0168837 A1 | 9/2004 | Michaud |
| 2004/0216931 A1 | 11/2004 | Won |
| 2004/0216932 A1 | 11/2004 | Giovanetti |
| 2005/0007055 A1 | 1/2005 | Borenstein et al. |
| 2005/0027412 A1 | 2/2005 | Hobson |
| 2005/0085693 A1 | 4/2005 | Belson et al. |
| 2005/0107669 A1 | 5/2005 | Couvillon, Jr. |
| 2005/0166413 A1 | 8/2005 | Crampton |
| 2005/0168068 A1 | 8/2005 | Courtemanche et al. |
| 2005/0168070 A1 | 8/2005 | Dandurand |
| 2005/0225162 A1 | 10/2005 | Gibbins |
| 2005/0235898 A1 | 10/2005 | Hobson |
| 2005/0235899 A1 | 10/2005 | Yamamoto |
| 2005/0288819 A1 | 12/2005 | de Guzman |
| 2006/0000137 A1 | 1/2006 | Valdivia y Alvarado |
| 2006/0005733 A1 | 1/2006 | Rastegar et al. |
| 2006/0010702 A1 | 1/2006 | Roth |
| 2006/0070775 A1 | 4/2006 | Anhalt |
| 2006/0156851 A1 | 7/2006 | Jacobsen |
| 2006/0225928 A1 | 10/2006 | Nelson |
| 2006/0229773 A1 | 10/2006 | Peretz |
| 2007/0029117 A1 | 2/2007 | Goldenberg et al. |
| 2007/0156286 A1 | 7/2007 | Yamauchi |
| 2007/0193790 A1 | 8/2007 | Goldenberg et al. |
| 2007/0260378 A1 | 11/2007 | Clodfelter |
| 2008/0115687 A1 | 5/2008 | Gal et al. |
| 2008/0164079 A1 | 7/2008 | Jacobsen |
| 2008/0167752 A1 | 7/2008 | Jacobsen |
| 2008/0168070 A1 | 7/2008 | Naphade |
| 2008/0215185 A1 | 9/2008 | Jacobsen |
| 2008/0272647 A9 | 11/2008 | Hirose et al. |
| 2008/0284244 A1 | 11/2008 | Hirose et al. |
| 2009/0035097 A1 | 2/2009 | Loane |
| 2009/0171151 A1 | 7/2009 | Choset et al. |
| 2010/0030377 A1 | 2/2010 | Unsworth |
| 2010/0174422 A1 | 7/2010 | Jacobsen |
| 2010/0201185 A1 | 8/2010 | Jacobsen |
| 2010/0201187 A1 | 8/2010 | Jacobsen |
| 2010/0317244 A1 | 12/2010 | Jacobsen |
| 2010/0318242 A1 | 12/2010 | Jacobsen |

FOREIGN PATENT DOCUMENTS

| | | |
|---|---|---|
| CN | 1603068 A | 4/2005 |
| CN | 2774717 | 4/2006 |
| CN | 1970373 | 5/2007 |
| DE | 3025840 | 2/1982 |
| DE | 3626238 | 2/1988 |
| DE | 19617852 | 10/1997 |
| DE | 19714464 | 10/1997 |
| DE | 19704080 | 8/1998 |
| DE | 10018075 | 1/2001 |
| DE | 102004010089 | 9/2005 |
| EP | 0105418 | 4/1984 |
| EP | 0584520 | 3/1994 |
| EP | 0818283 | 1/1998 |
| EP | 0924034 | 6/1999 |
| EP | 1444043 | 8/2004 |
| EP | 1510896 | 3/2005 |
| EP | 1832501 | 9/2007 |
| EP | 1832502 | 9/2007 |
| FR | 2638813 | 5/1990 |
| FR | 2850350 | 7/2004 |
| GB | 1199729 | 7/1970 |
| JP | 52 57625 | 5/1977 |
| JP | 58-89480 | 5/1983 |
| JP | 60015275 | 1/1985 |
| JP | 60047771 | 3/1985 |
| JP | 60060516 | 4/1985 |
| JP | 60139576 | 7/1985 |
| JP | 61001581 | 1/1986 |
| JP | 61089182 | 5/1986 |
| JP | 63306988 | 12/1988 |
| JP | 04092784 | 3/1992 |
| JP | 05147560 | 6/1993 |
| JP | 06-115465 | 4/1994 |
| JP | 03535508 | 6/2004 |
| JP | 2005111595 | 4/2005 |
| WO | WO 97/26039 | 7/1997 |
| WO | WO 00/10073 | 2/2000 |
| WO | WO 02/16995 | 2/2002 |

| WO | WO 03/030727 | 4/2003 |
| --- | --- | --- |
| WO | WO 03037515 | 5/2003 |
| WO | WO 2005/018428 | 3/2005 |
| WO | WO 2006068080 | 6/2006 |
| WO | WO 2008/049050 | 4/2008 |
| WO | WO 2008/076194 | 6/2008 |
| WO | WO 2008/135978 | 11/2008 |
| WO | WO 2009/009673 | 1/2009 |

OTHER PUBLICATIONS

U.S. Appl. No. 12/151,730, filed May 7, 2008, Stephen C. Jacobsen; Office Action Issued Nov. 15, 2010.
U.S. Appl. No. 12/171,144, filed Jul. 10, 2008, Stephen C. Jacobsen; Office Action Issued Aug. 11, 2010.
U.S. Appl. No. 11/985,324, filed Nov. 13, 2007; Stephen C. Jacobsen; Office Action Issued Nov. 1, 2010.
PCT/US10/38331; filed Jun. 11, 2009; Stephen C. Jacobsen; ISR Issued Dec. 1, 2010.
U.S. Appl. No. 12/820,881, filed Jun. 22, 2010, Stephen C. Jacobsen; office action issued Nov. 30, 2010.
Arnold, Henry, "Cricket the robot documentation." online manual available at http://www.parallaxinc.com, 22 pages.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.
Hirose, et al., "Snakes and strings; new robotic components for rescue operations," International Journal of Robotics Research, Apr.-May 2004, pp. 341-349, vol. 23, No. 4-5.
Paap et al., "A robot snake to inspect broken buildings," IEEE, 2000, pp.. 2079-2082, Japan.
Braure, Jerome, "Participation to the construction of a salamander robot: exploration of the morphological configuration and the locomotion controller", Biologically Inspired Robotics Group, master thesis, Feb. 17, 2004, pp. 1-46.
Jacobsen, et al., Advanced intelligent mechanical sensors (AIMS), Proc. IEEE Trandsucers 1991, Jun. 24-27, abstract only, San Fransico, CA.
Jacobsen, et al., "Research robots for applications in artificial intelligence, teleoperation and entertainment", International Journal of Robotics Research, 2004, pp. 319-330, vol. 23.
Jacobsen, et al., "Multiregime MEMS sensor networks for smart structures," Procs. SPIE 6th Annual Inter. Conf. on Smart Structures and Materials, Mar. 1-5, 1999, pp. 19-32, vol. 3673, Newport Beach CA.
MacLean et al., "A digital MEMS-based strain gage for structural health monitoring," Procs. 1997 MRS Fall Meeting Symposium, Nov. 30-Dec. 4, 1997, pp. 309-320, Boston Massachusetts.
Berlin et al., "MEMS-based control of structural dynamic instability", Journal of Intelligent Material Systems and Structures, Jul. 1998 pp. 574-586, vol. 9.
Goldfarb, "Design and energetic characterization of a liquid-propellant-powered actuator for self-powered robots," IEEE Transactions on Mechatronics, Jun. 2003, vol. 8 No. 2.
Dowling, "Limbless Locomotion: Learning to crawl with a snake robot," The Robotics Institute at Carnegie Mellon University, Dec. 1997, pp. 1-150.

Matthew Heverly & Jaret Matthews: "A wheel-on-limb rover for lunar operation" Internet article, Nov. 5, 2008, pp. 1-8, http://robotics.estec.esa.int/i-SAIRAS/isairas2008/Proceedings/SESSION%2026/m116-Heverly.pdf.
NASA: "Nasa's newest concept vehicles take off-roading out of this world" Internet article, Nov. 5, 2008, http://www.nasa.gov/mission_pages/constellation/main/lunar_truck.html.
Revue Internationale De defense, "3-D vision and urchin" Oct. 1, 1988, p. 1292, vol. 21, No. 10, Geneve CH.
Advertisement, International Defense review, Jane's information group, Nov. 1, 1990, p. 54, vol. 23, No. 11, Great Britain.
Ren Luo "Development of a multibehavior-based mobile robot for remote supervisory control through the internet" IEEE/ ASME Transactions on mechatronics, IEEE Service Center, Piscataway, NY, Dec. 1, 2000, vol. 5, No. 4.
Nilas Sueset et al., "A PDA-based high-level human-robot interaction" Robotics, Automation and Mechatronics, IEEE Conference Singapore, Dec. 1-3, 2004, vol. 2, pp. 1158-1163.
U.S. Appl. No. 12/171,144, filed Jul. 10, 2008, Stephen C. Jacobsen; office action mailed Jan. 13, 2011.
U.S. Appl. No. 12/694,996, filed Jan. 27, 2010, Stephen C. Jacobsen; office action mailed Jan. 26, 2011.
PCT Application PCT/US2010/038339; filing date Jun. 11, 2010; Stephen C. Jacobsen; ISR mailed Feb. 9, 2011.
U.S. Appl. No. 11/985,320, filed Nov. 13, 2007, Stephen C. Jacobsen; office action issued Apr. 12, 2011.
U.S. Appl. No. 11/985,324, filed Nov. 13, 2007, Stephen C. Jacobsen; notice of allowance issued Apr. 18, 2011.
U.S. Appl. No. 12/151,730, filed May 7, 2008, Stephen C. Jacobsen; notice of allowance issued Apr. 15, 2011.
U.S. Appl. No. 11/985,336, filed Nov. 13, 2007, Stephen C. Jacobsen; office action issued Jun. 14, 2011.
U.S. Appl. No. 12/820,881, filed Jun. 22, 2010, Stephen C. Jacobsen; notice of allowance issued Jun. 9, 2011.
U.S. Appl. No. 11/985,320, filed Nov. 13, 2007, Stephen C. Jacobsen; office action mailed Aug. 17, 2011.
U.S. Appl. No. 12/350,693, filed Jan. 8, 2009, Stephen C. Jacobsen; office action issued Oct. 12, 2011.
U.S. Appl. No. 12/814,302; filed Jun. 11, 2010; Stephen C. Jacobsen; office action issued Jan. 10, 2012.
U.S. Appl. No. 11/985,336; filed Nov. 13, 2007; Stephen C. Jacobsen; notice of allowance issued Jan. 19, 2012.
U.S. Appl. No. 12/171,146; filed Jul. 10, 2008; Stephen C. Jacobsen; office action issued Feb. 9, 2012.
U.S. Appl. No. 12/350,693; filed Jan. 8, 2009; Stephen C. Jacobsen; office action issued Mar. 28, 2012.
Mehling et al; A Minimally Inbasive Tendril Robot for In-Space Inspection; Feb. 2006; The First IEEE/RAS-EMBS International Conference on Biomedical Robotics and Biomechatronics (BioRob '06) p. 690-695.
U.S. Appl. No. 11/985,320; filed Nov. 13, 2007; Stephen C. Jacobsen; office action issued Apr. 25, 2012.
U.S. Appl. 12/814,302; filed Jun. 11, 2010; Stephen C. Jacobsen; office action issued Apr. 18, 2012.

* cited by examiner

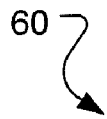

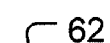
Providing an endless track looped around a forward guide and a rearward guide of the lightweight robotic vehicle.

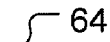
Deflecting a ground-engaging portion of the endless track in between the forward guide and the rearward guide in a downward direction to form a peaked area of the endless track.

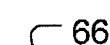
Supporting the lightweight robotic vehicle at least partially by the peaked area so as to enable changing distribution of load over the ground-engaging portion of the endless track with respect to a supporting surface

*FIG. 5*

CONFORMABLE TRACK ASSEMBLY FOR A ROBOTIC CRAWLER

RELATED APPLICATIONS

This application is a continuation of co-pending U.S. patent application Ser. No. 11/985,324, filed Nov. 13, 2007, which claims the benefit of U.S. Provisional Patent Application No. 60/858,805, filed Nov. 13, 2006 in the United States Patent and Trademark Office, and entitled, "Conformable Track Assembly For A Robotic Crawler," which application is incorporated by reference in its entirety herein.

FIELD OF THE INVENTION

The present invention relates to small, unmanned ground robotic vehicles. More particularly, the present invention relates to a suspension system for mounting a flexible endless track to support a lightweight robotic vehicle.

BACKGROUND OF THE INVENTION AND RELATED ART

Unmanned robotic vehicles can be deployed in a variety of applications and environments, including for example, search and rescue, military operations, and industrial operations. Unmanned robotic vehicles can help to avoid the need to expose humans to hazardous environments, such as unstable buildings, military conflict situations, and chemically, biologically, or nuclear contaminated environments.

Unmanned robotic vehicles face many challenges when attempting mobility. Terrain can vary widely, including for example, bumpy or smooth surfaces, firm or soft ground, loose and shifting materials, etc. For small robotic vehicles, the challenges become even greater. A vehicle optimized for operation in one environment may perform poorly in other environments.

The use of endless tracks are known to provide a good compromise which allows a robotic vehicle to accommodate a large variation in terrain types while maintaining relatively good traction and maneuverability. For example, tank-like vehicles using a pair of parallel endless tracks can provide high stability in some environments.

Tracked vehicles are typically steered using skid steering. In skid steering, the tracks on opposite sides of the vehicle are moved at different rates. Skid steering can be inefficient, as portions of the tracks move perpendicular to the direction of travel. There can be significant friction opposing this sideways motion. For longer tracks, greater force must be applied to overcome this friction. The inefficiency of skid steering also increases for tighter radius turns. The inefficiency of skid steering is at a peak when there is no net forward movement of the vehicle, only rotation around a central pivot point. A sharp turning radius can also result in significant stress on the vehicle suspension components due to the lateral movement. For lightweight robotic vehicles which tend to have limited drive power available, sharp turns may therefore be difficult or impossible to obtain.

SUMMARY OF THE INVENTION

The present invention includes a suspension system for a flexible endless track that helps to overcome problems and deficiencies inherent in the prior art. In one embodiment, the suspension system includes a frame, on which a forward guide, rearward guide, and at least one deflector are mounted. An endless track can be looped around the forward guide and rearward guide. The deflector downwardly deflects a ground-engaging portion of the endless track between the forward guide and the rearward guide to form a peaked area. The deflector is configured as a full load-bearing component capable of altering a distribution of load over the ground-engaging portion of the endless track with respect to a supporting surface.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, can be arranged and designed in a wide variety of different configurations. Nonetheless, the invention will be described and explained with additional specificity and detail through the use of the accompanying drawings in which:

FIG. 5 illustrates a flow diagram of a method for supporting a lightweight robotic vehicle on an endless track according to an embodiment of the present invention.

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Figure 1:
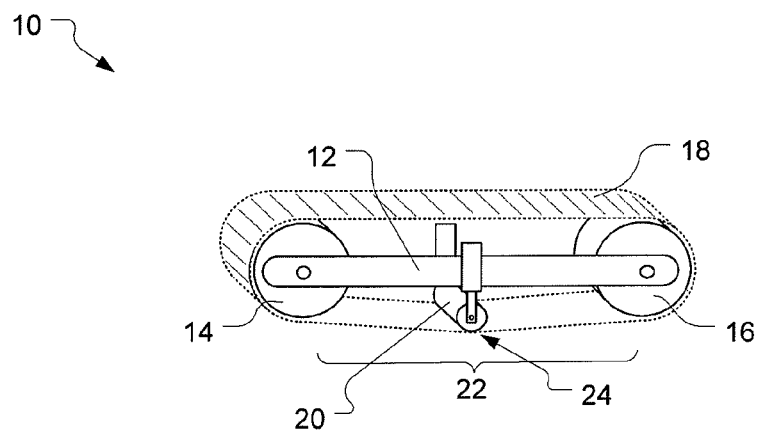
FIG. 1 illustrates a perspective view of a suspension system for mounting a flexible endless track according to an exemplary embodiment of the present invention.

With reference to FIG. 1, shown is an illustration of a suspension system for mounting a flexible endless track thereon to support a lightweight robotic vehicle according to a first exemplary embodiment of the present invention. Specifically, FIG. 1 illustrates the suspension system 10 as including a frame 12 having a forward guide 14 and a rearward guide 16 coupled thereto. An endless track 18 can be looped around the forward guide and the rearward guide. A deflector 20 is coupled to the frame between the forward guide and the rearward guide. The deflector downwardly deflects the ground-engaging portion 22 of the endless track to form a peaked area 24. The deflector is a load-bearing component, capable of supporting the lightweight robotic vehicle. The deflector is thus capable of altering a distribution of loading over the ground-engaging portion of the endless track with respect to a supporting surface. In other words, the deflector can be extended or retracted to cause different distributions of the weight of the robotic vehicle over the ground-engaging portion of the endless track. For example, the deflector can be extended to cause the weight of the robot to be substantially concentrated on the portion of the ground-engaging portion under the deflector. As another example, the deflector can be retracted to cause the weight of the robot to be distributed substantially over the entire ground-engaging portion of the endless track. Of course, various other weight distributions in between these extremes are also possible. The actual distribution of weight over the ground-engaging portion of the endless track will be a function of the amount of deflection of the deflector and the properties of the surface on which the lightweight robotic vehicle is operated. The orientation of the lightweight robotic vehicle can thereby be altered with respect to a supporting surface by operation of the deflector.

Figure 2:
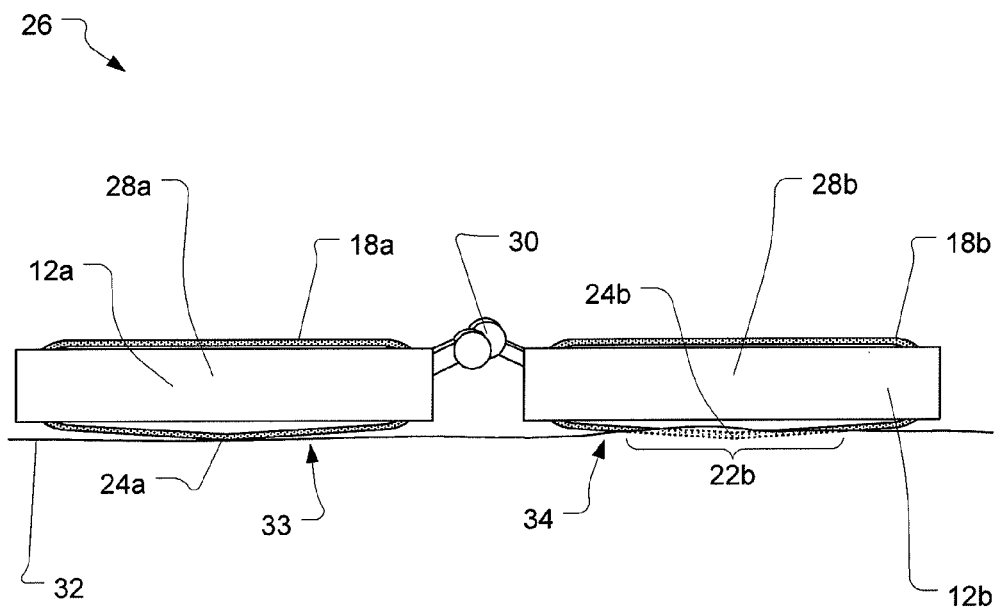
FIG. 2 illustrates a perspective view of a lightweight robotic vehicle having a suspension system in accordance with another embodiment of the present invention.

Operation of a lightweight robotic vehicle using a suspension system in accordance with an embodiment of the present invention will now be described. FIG. 2 illustrates an exemplary tandem configuration of a lightweight robotic vehicle 26 using two tracked units 28a, 28b, each having a suspension system 10 as described above. The tracked units are linked together by an articulated arm 30. For example, commonly-owned U.S. Provisional Non-provisional patent application Ser. No. 11/985,322, entitled, "Serpentine Robotic Crawler," filed Nov. 13, 2007 and incorporated in its entirety by reference herein, describes a serpentine robotic crawler in which the suspension system of the present invention can be used.

The lightweight robotic vehicle 26 is operated on a supporting surface 32. When operated over a firm area 33 of the supporting surface, the peaked area 24a of the endless track helps to support substantially all of the weight of tracked unit 28a. In contrast, when operated over a soft area 34 of the supporting surface, the peaked area 24b of the endless track will sink into the supporting surface, and the weight of tracked unit 28b is distributed over the ground-engaging portion 22b of the endless track. It will be appreciated that the operation of the endless tracks 18a, 18b and articulated arm 30 can be coordinated to maintain the lightweight robotic vehicle balanced on the peaked areas of the endless tracks.

When a lightweight robotic vehicle using the suspension system 10 is operated on a firm surface, the deflector lifts the lightweight robotic vehicle up so that most of the endless track is off the supporting surface. Hence, only the small area of the endless track near the peaked area 24 is in contact with the supporting surface. This helps to reduce friction when skid steering is performed, allowing for a tighter turning radius as compared to a conventional endless track, which provides a flat ground-engaging surface. Turning performing is accordingly more comparable to that of a wheeled vehicle than a tracked vehicle.

When the lightweight robotic vehicle is operated on a soft surface, a larger ground-engaging area of the endless track is in contact with the supporting surface. This provides better fraction than a wheeled vehicle. Turning radius is not greatly reduced, however, as the soft surface provides relatively little friction to lateral movement of the track. Hence, the suspension system provides an improvement in turning radius over a conventional endless track on firm surfaces, while retaining the fraction advantages of the endless track on soft surfaces.

Various alternate arrangements of the components of the suspension 10 are possible. Referring back to FIG. 1, the forward guide 14, rearward guide 16, and deflector 20 can be rollers rotatably mounted to the frame 12. The forward guide, rearward guide, and deflector can be mounted in fixed positions on the frame relative to each other, although this is not essential. Alternately, the forward guide, the rearward guide, or the deflector can be movable, for example to help maintain constant tension in the track.

The deflector 20 can also include a load-sensing element (not shown). For example, the load-sensing element can be a load cell, strain gauge, pressure sensor, or the like as is known in the art. During operation of the lightweight robotic vehicle, the deflector may support a varying portion of the lightweight robotic vehicle's weight, and thus a load-sensing element on the deflector can provide useful information for control of the lightweight robotic vehicle. For example, a lightweight robotic vehicle may be in a tank-like configuration where parallel endless tracks are disposed on each side of the vehicle. Each endless track can include a deflector and associated load-sensing element. When the vehicle is at risk of tipping sideways, the load sensed on one deflector will greatly exceed the other deflector. Corrective action can then be taken.

Figure 3:
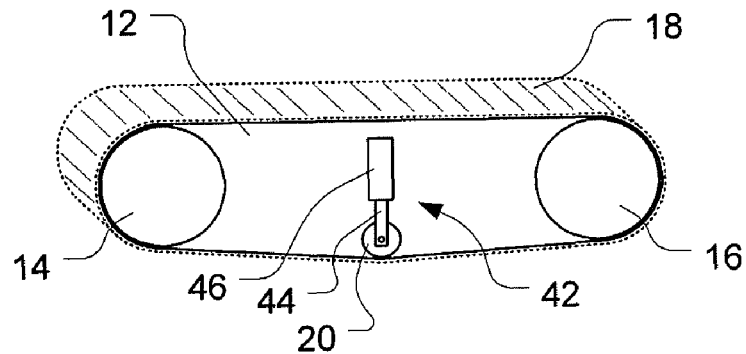
FIG. 3 illustrates a side view of a suspension system for mounting a flexible endless track according to another exemplary embodiment of the present invention.

In accordance with another embodiment of the present invention, as illustrated in FIG. 3, a suspension system 40 can include a moveable deflector assembly 42. For example, the deflector 20 can be mounted to a piston arm 44 that is driven up and down by hydraulic cylinder 46. This can allow the amount of downward deflection of the endless track to be adjusted during operation of the lightweight robotic vehicle. For example, when operating on hard surface, the deflector may be displaced downward to provide a strongly curved peaked area to enable tight turning. When operating on a soft surface, the deflector may be displaced upward to provide a flatter ground-engaging area to maximize traction. Optionally, track tensioning components (not shown) can be included to maintain proper tension of the endless track as the deflector is moved up or down. The hydraulic cylinder is capable of generating enough force to enable supporting the full weight of the lightweight robotic vehicle. For example, for a lightweight robotic vehicle which weighs 20 pounds (or less), downward deflector force of 20 pounds (or more) is sufficient to allow the full weight of the lightweight robotic vehicle to be carried by the peaked area of the track. Since the deflector is capable of supporting the full weight of the lightweight robotic vehicle, it will be appreciated that heavier vehicles require a more robust deflector design. Accordingly, it is expected that lightweight robotic vehicles are more adaptable to embodiments of the present invention than large, heavy vehicles. More particularly, while many different deflector configurations will be suitable for supporting a lightweight robotic vehicle, a single deflector capable of supporting a large tank, for example, appears somewhat impractical.

Figure 4:
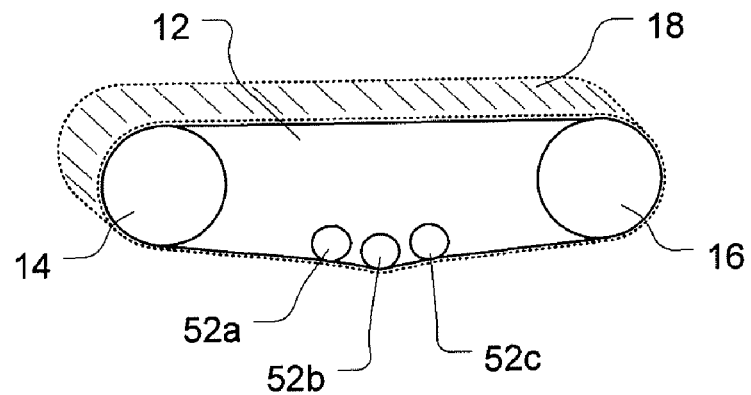
FIG. 4 illustrates a side view of a suspension system for mounting a flexible endless track according to yet another exemplary embodiment of the present invention.

In accordance with another embodiment of the present invention, as illustrated in FIG. 4, a suspension system 50 can include multiple deflectors 52a, 52b, 52c coupled to the frame 12. The multiple deflectors downwardly deflect the ground-engaging portion of the endless track to form the peaked area into a curved shape. Multiple deflectors can provide various different profiles, allowing the detailed shape of the peaked area to be optimized for particular environments. For example, multiple moveable deflectors can be used to dynamically vary the shape of the peaked area during operation, as well as adjust the vertical orientation, or pitch, of the lightweight robotic vehicle. Multiple deflectors can also provide some benefit in allowing the load of the lightweight robotic vehicle to be distributed over multiple components. As discussed above, the deflectors can include load-sensing elements. Operation of the deflectors may be modified based on measurements obtained from the load-sensing elements.

In accordance with another embodiment of the present invention, as illustrated in FIG. 5, a method for supporting a lightweight robotic vehicle on an endless track is shown in flow diagram form. The method, shown generally at 60, includes providing 62 an endless track looped around a forward guide and a rearward guide of the lightweight robotic vehicle. For example, various examples of suspension systems having a forward guide and a rearward guide are discussed above. The method also includes deflecting 64 a ground-engaging portion of the endless track between the forward guide and the rearward guide in a downward direction to form a peaked area of the endless track. Various examples of deflectors are discussed above. Finally, the method includes supporting 66 the lightweight robotic vehicle at least partially by the peaked area so as to enable changing distribution of load over the ground-engaging portion of the endless track with respect to a supporting surface. For example, the lightweight robotic vehicle can be balanced on the peaked area as discussed above. As another example, the lightweight robotic vehicle can be pivoted on the peaked area to provide a short or zero radius turn.

Optionally, as discussed above, the method can include operating the lightweight robotic vehicle on a firm surface such that the peaked area of the endless track supports substantially all of the weight of the lightweight robotic vehicle. This can help to provide short radius turns. In addition, as discussed above, the method can include operating the lightweight robotic vehicle on a soft surface such that the weight of the lightweight robotic vehicle is distributed over the ground-engaging portion of the endless track. This can help to provide high traction.

The method can also include coupling the lightweight robotic vehicle to a second lightweight robotic vehicle, for example as described above. Operation of the coupled lightweight robotic vehicles can be coordinated to maintain one (or both) of the lightweight robotic vehicles balanced on the peaked area.

Finally, the method can also include moving the deflector up or down. For example, moving the deflector down can create a more strongly peaked area of the endless track to provide for shorter turning radius. Moving the deflector up can create a more flat ground-engaging portion of the endless track to provide for better traction.

Summarizing and reiterating to some extent, various endless track suspension system configurations have been described which provide various benefits over the prior art. For example, deflecting a portion of the ground-engaging surface of the endless track to form a peaked area can provide a tight turning radius for a lightweight robotic vehicle operated over a firm surface. Multiple and/or moveable deflectors can be included to allow varying the shape of the peaked area. A lightweight robotic vehicle using an embodiment of the present invention can provide improved turning radius without sacrificing the traction benefit provided by the large ground-engaging portion of an endless track.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present: a) "means for" or "step for" is expressly recited in that limitation; b) a corresponding function is expressly recited in that limitation; and c) structure, material or acts that support that function are described within the specification. Accordingly, the scope of the invention should be determined solely by the appended claims and their legal equivalents, rather than by the descriptions and examples given above.

What is claimed is:

1. A lightweight robotic vehicle having tandem endless tracks supported on conformable suspension systems, comprising:
    at least two frames coupled in tandem by an active, actuatable articulated linkage arm, each frame comprising:
        a forward guide coupled to the frame and configured to receive a looped portion of the endless track around the forward guide;
        a rearward guide coupled to the frame and configured to receive a looped portion of the endless track around the rearward guide; and
        at least one deflector operable with the frame between the forward guide and the rearward guide, the at least one deflector being configured to downwardly deflect a ground-engaging portion of the endless track between the forward guide and the rearward guide to form a peaked area confined between the forward guide and the rearward guide,
    wherein movement and pose of the lightweight robotic vehicle is at least partially controlled by the articulated linkage arm, and
    wherein the deflectors of each of the at least two frames are selectively engageable to support the associated frames simultaneously or individually at least partially on the respective peaked areas in response to variable surface conditions.

2. The robotic vehicle of claim 1, wherein the articulated linkage arm comprises a multi-degree of freedom linkage arm having a series coupled combination of at least seven actuated joints.

3. The robotic vehicle of claim 1, wherein the deflector is selectively engageable to deflect the ground-engaging portion of the endless track in response to changing surface conditions.

4. The robotic vehicle of claim 1, wherein the at least two endless tracks and the articulated linkage arm are operable to maintain at least one frame balanced on the peaked area of the associated endless track.

5. The robotic vehicle of claim 1, further comprising a plurality of deflectors coupled to the frame in positions between the forward guide and the rearward guide and configured to downwardly deflect the ground-engaging portion of the endless track to form the peaked area into a curved shape.

6. The robotic vehicle of claim 1, wherein the endless track is flexible.

7. The robotic vehicle of claim 1, wherein at least one of the forward guide and rearward guide is movable relative to the other to maintain constant tension of the endless track.

8. The robotic vehicle of claim 1, wherein the deflector further comprises a moveable deflector assembly including a roller mounted to a piston arm, and with the piston arm being actuated by a hydraulic cylinder.

9. The robotic vehicle of claim 1, wherein the deflector further comprises a load-sensing element adapted to relay information about a load acting on the lightweight robotic vehicle.

10. The robotic vehicle of claim 9, wherein the load-sensing element is selected from the group consisting of a load cell, a strain gauge, a pressure sensor and combinations thereof.

11. The robotic vehicle of claim 1, wherein the at least two frames coupled in tandem with an active articulated linkage arm further comprise at least three frames coupled in tandem with a plurality of active articulated linkage arms.

12. A lightweight robotic vehicle having tandem endless tracks supported on conformable suspension systems, comprising:
at least two frames coupled in tandem with an active, actuatable articulated linkage arm, each frame comprising:
a forward guide coupled to the frame and configured to receive a looped portion of the endless track around the forward guide;
a rearward guide coupled to the frame and configured to receive a looped portion of the endless track around the rearward guide; and
at least one deflector operable with the frame, the at least one deflector being selectively engageable to deflect the ground-engaging portion of the endless track between the forward guide and the rearward guide to form a peaked area confined between the forward guide and the rearward guide,
wherein the deflectors of each of the at least two frames are selectively engageable to support the frames simultaneously or individually at least partially on the respective peaked areas,
wherein movement and pose of the lightweight robotic vehicle is at least partially controlled by the articulated linkage arm, and
wherein the at least two endless tracks and the articulated linkage arm are operable to maintain at least one frame balanced on the peaked area of the associated endless track.

13. A method for supporting a lightweight robotic vehicle on tandem endless tracks, comprising:
operating a first endless track looped around a forward guide and a rearward guide of a first frame;
operating a second endless track looped around a forward guide and a rearward guide of a second frame, the first and second frames being coupled in tandem by an active, actuatable articulated linkage arm;
selectively deflecting at least one ground-engaging portion of at least one of the first and second endless tracks in a downward direction to form a peaked area of the endless track confined between the forward guide and the rearward guide, wherein the first and second frames are simultaneously or individually supported at least partially on the respective peaked areas; and
articulating the articulated linkage arm to establish a desired pose for the lightweight robotic vehicle and to support at least one of the first and second frames at least partially on the formed peaked area so as to enable changing distribution of load over the ground-engaging portion of the deflected endless track with respect to a supporting surface.

14. The method of claim 13, further comprising coordinating operation of the first endless track and the second endless track and the articulated linkage arm to maintain the lightweight robotic vehicle balanced on at least one of the peaked areas.

15. The method of claim 13, further comprising coupling the lightweight robotic vehicle to a second lightweight robotic vehicle, and coordinating operation of the first and second lightweight robotic vehicles to maintain the lightweight robotic vehicle balanced on at least one of the peaked areas.

16. The method of claim 13, further comprising:
selectively deflecting the ground-engaging portions of both the first and second endless tracks in a downward direction to form peaked areas of both the first and second endless tracks; and
coordinating operation of the first and second endless tracks and the articulated linkage arm to maintain the robotic vehicle balanced on the peaked areas.

17. The method of claim 13, further comprising operating the robotic vehicle on a firm surface such that the peaked area supports substantially all the weight of the associated frame.

18. The method of claim 13, further comprising operating the robotic vehicle on a soft surface such that the weight of the associated frame is distributed substantially over the ground-engaging portion of the endless track.

19. The method of claim 13, further comprising selectively deflecting the ground-engaging portion in an upward direction to create a flat ground-engaging portion of the endless track.

20. The method of claim 13, further comprising selectively deflecting the ground-engaging portion along a vertical axis to vary a degree of curvature of the peaked area of the endless track.

21. The method of claim 13, further comprising:
providing at least one additional endless track looped around a forward guide and a rearward guide of at least one additional frame; and
coupling the at least one additional frame in tandem with either of the first and second frames with at least one additional active, actuatable articulated linkage arm, the lightweight robotic vehicle comprising the first, second and at least one additional frames.

* * * * *